(12) United States Patent
Marshall, III

(10) Patent No.: US 12,655,601 B2
(45) Date of Patent: Jun. 16, 2026

(54) TAPE MOUNTING SYSTEM FOR A FOUNDATION COVERING

(71) Applicant: Your Crawl Space, Inc., Awendaw, SC (US)

(72) Inventor: Henry Bennie Marshall, III, McClellanville, SC (US)

(73) Assignee: YOUR CRAWL SPACE, INC., Awendaw, SC (US)

( * ) Notice: Subject to any disclaimer, the term of this patent is extended or adjusted under 35 U.S.C. 154(b) by 125 days.

(21) Appl. No.: 18/520,951

(22) Filed: Nov. 28, 2023

(65) Prior Publication Data

US 2024/0175230 A1      May 30, 2024

Related U.S. Application Data

(60) Provisional application No. 63/385,456, filed on Nov. 30, 2022.

(51) Int. Cl.
| | |
|---|---|
| *E02D 31/00* | (2006.01) |
| *C09J 7/21* | (2018.01) |
| *C09J 7/40* | (2018.01) |

(52) U.S. Cl.
CPC .............. *E02D 31/004* (2013.01); *C09J 7/21* (2018.01); *C09J 7/40* (2018.01)

(58) Field of Classification Search
CPC .............. E02D 31/004; C09J 7/21; C09J 7/40
See application file for complete search history.

(56) References Cited

U.S. PATENT DOCUMENTS

| | | | |
|---|---|---|---|
| 3,035,374 A | 5/1962 | Burris | |
| 3,424,647 A | 1/1969 | Callahan et al. | |

| | | | |
|---|---|---|---|
| 4,421,807 A | 12/1983 | Clausing et al. | |
| 4,735,838 A | 4/1988 | Roberts et al. | |
| 5,254,399 A | 10/1993 | Oku et al. | |
| 5,495,696 A | 3/1996 | Repka | |
| 5,630,299 A | 5/1997 | Jackman et al. | |

(Continued)

FOREIGN PATENT DOCUMENTS

DE      202005004614 U1 *    5/2005

OTHER PUBLICATIONS

DE202005004614U1 Machine Translation of Description (Year: 2025).*

*Primary Examiner* — Cynthia L Schaller

(74) *Attorney, Agent, or Firm* — KIM AND LAHEY LAW FIRM, LLC; Seann P. Lahey

(57)      ABSTRACT

A tape mounting system for a foundation covering having an adhesion strip including a porous substrate material. The porous substrate material having a wall adhesion side and a covering adhesion side facing opposite the wall adhesion side. An instant bond adhesive portion is included on the wall adhesion side and carries a first instant bond adhesive. An adhesive absorbing portion is included on the wall adhesion side that receives and absorbs an adhesive bead applied to a foundation wall. A second instant bond adhesive is disposed on the covering adhesion side for engaging a foundation wall covering. The instant bond adhesive on the wall adhesion side secures the adhesion strip to the foundation wall until the adhesive bead is cured to carry the foundation wall covering so that an air and moisture tight seal is formed between the foundation wall, the adhesion strip, and the covering material.

20 Claims, 9 Drawing Sheets

(56)  References Cited

U.S. PATENT DOCUMENTS

| | | | |
|---|---|---|---|
| 5,981,235 A | 11/1999 | Vergnano | |
| 5,983,586 A | 11/1999 | Berdan et al. | |
| 6,256,956 B1 | 7/2001 | Davis | |
| 6,575,666 B1 | 6/2003 | Janesky | |
| 6,881,247 B2 | 4/2005 | Batdorf | |
| 6,905,563 B2 | 6/2005 | Dong | |
| 6,926,469 B2 | 8/2005 | Janesky | |
| 7,060,155 B2 | 6/2006 | Dong et al. | |
| 7,421,826 B2 | 9/2008 | Collins et al. | |
| 7,735,271 B1 | 6/2010 | Shipston et al. | |
| 7,856,767 B2 | 12/2010 | Janesky | |
| 8,007,205 B2 | 8/2011 | Marshall, III | |
| 8,608,883 B2 | 12/2013 | Blasdel et al. | |
| 8,720,145 B2 | 5/2014 | Marshall, III | |
| 9,476,177 B2 | 10/2016 | Blasdel et al. | |
| 2004/0040227 A1 | 3/2004 | Tozaka et al. | |
| 2004/0103608 A1 | 6/2004 | Lionel | |
| 2004/0137813 A1 | 7/2004 | Faucher | |
| 2005/0210772 A1 | 9/2005 | Janesky | |
| 2005/0246990 A1 | 11/2005 | Geska et al. | |
| 2007/0130849 A1 | 6/2007 | Langer et al. | |
| 2007/0130864 A1 | 6/2007 | Semmens et al. | |
| 2007/0157533 A1 | 7/2007 | Janesky et al. | |
| 2007/0175112 A1 | 8/2007 | Janesky | |
| 2007/0204530 A1 | 9/2007 | Janesky | |
| 2007/0224003 A1 | 9/2007 | Janesky | |
| 2008/0120935 A1 | 5/2008 | Lembo | |
| 2013/0125481 A1* | 5/2013 | Marshall | E04B 1/62 52/169.14 |
| 2017/0058510 A1* | 3/2017 | Seabaugh | B32B 27/36 |
| 2022/0282476 A1 | 9/2022 | Widenbrant et al. | |

* cited by examiner

TAPE MOUNTING SYSTEM FOR A FOUNDATION COVERING

BACKGROUND OF THE INVENTION

1) Field of the Invention

The present invention relates to mounting tapes, and more particularly, to a tape mounting system for securing and sealing a covering to a foundation wall and the like using an instant bond adhesive on a first part of the tape for initial mounting, and using a low volatile organic compound (VOC) environmentally friendly adhesive on a second part that cures over time for a permanent installation with an airtight and moisture tight seal between the covering and the foundation wall.

2) Description of Related Art

A crawlspace is a low or narrow space, such as one beneath the upper or lower story of a building that gives workers access to items such as plumbing or wiring equipment. In residential structures, typically, this space is defined by the structure's foundation walls so that the crawlspace is enclosed under the lowest floor of the structure. Foundation walls are generally composed of concrete blocks or poured concrete walls. The bottom of the crawlspace is generally ground, which in most cases is simply dirt or sand. In other cases, the ground floor may be poured concrete. The floor above the crawlspace is generally made of wood. Additionally, the crawlspace dirt floor is generally lower then the soil surrounding the structure. Further, the crawlspace is generally not well insulated, and due to leaks, cracks and vents, is generally exposed to the outside environment.

Due to limited airflow in a crawlspace, moisture that seeps out of the ground and into the crawlspace causes the crawlspace to become damp and may stay damp for extended periods of time. This moisture can be very damaging to the structure's foundation walls, floor joists, and other structural components, often leading to premature deterioration of the structure and costly repairs. Additionally, mold, mildew, insects and other undesirable conditions can develop in the crawlspace which can affect the foundation walls and produce an unhealthy environment for inhabitants within the living spaces of the structure above. Additionally, the non-insulated crawlspace allows for the temperature differential between the living space of a home and the crawlspace to approach or be equal to the temperature differential between the living space and the outdoors.

Due to the enclosed nature of the crawlspace, volatile materials, such as construction grade adhesives, that create a hazardous environment, whether through flammable vapors or toxic fumes, is highly undesirable for poorly ventilated spaces. For example, adhesives that produce toxic fumes or flammable vapors are not desirable to use on foundation walls as they can accumulate in the crawlspace, creating a fire hazard due to low ventilation.

Further, such undesirable contaminants in the crawlspace can flow into the air of the structure itself. The natural airflow in a structure is from bottom to top. Based on the principle that warm air rises, as the air in the structure heats up, it moves up through the structure. Once this warm air makes its way up to the attic and roof levels, it will normally be vented out though the soffits or a ridge vent. Much of the air that flows in a structure comes from the crawlspace. In older, more "leaky structures", the air exchange rate can be as high as two air changes per hour. It has been estimated that up to half of the air you breathe on the first floor of a structure is air that comes from the crawlspace. If there is high humidity in the crawlspace, there will be higher humidity in the living space. If there is mold and mildew in the crawlspace, there could be mold and mildew in the structure.

Additionally, when air leaks through the foundation walls into the crawlspace and flows into the living space, the temperature differential can undesirably heat or cool the living space therefore requiring more energy to maintain the temperature in the living space. Historically, the design of the crawlspace requires that the crawlspace be open with vents so that airflow can occur in the crawlspace. These vents are an attempt to reduce moisture in the crawlspace. However, these vents allow ambient air to enter the crawlspace.

By applying a covering such as a plastic sheet vapor barrier to the foundation wall, much of the moisture that enters a crawlspace can be eliminated. A problem arises in that typical construction adhesives capable of securing a plastic liner or other generally moisture resistant or moisture impervious sheets, for example wall board, plastic boards, BAT insulation, foam boards, and decorative panels, to a concrete foundation wall have high VOC levels and emit dangerous amounts of toxic and flammable vapor, which is a fire hazard for an enclosed area such as a crawlspace. To avoid the use of such dangerous adhesives, mechanical fasteners have been required to secure the covering to the foundation wall. This typically involves drilling into the foundation walls to properly secure the covering to the foundation walls. Installation of such systems has thus largely been limited to professional installers with the tools and abilities to accomplish such a task.

Another issue arises with the use of construction adhesives in that they typically require a certain amount of time, often hours or days, to fully cure after being applied to provide a secure and permanent attachment between the foundation wall and the covering. This creates a situation where installers may be limited in how fast they can install a covering such as a vapor barrier in a crawlspace while they wait for sections that have been mounted using only an adhesive caulk to cure before they can continue with further installation, or they risk dislodging the section previously installed which could ultimately lead to a failure of the vapor barrier system. Accordingly, it is desirable to have an instant bond adhesive to operate as a temporary bond while the primary construction caulk adhesive cures. This will allow for continued installation without the need to wait for the caulk adhesive to cure. The instant bond adhesive may then dislodge over time, thus the need for a more permanent caulk type construction adhesive.

Further, it is desirable for the covering to contain an antimicrobial property to provide additional protection against undesirable items such as mold and bacteria. With the proper covering sealed to the foundation wall, moisture levels and air infiltration can be better controlled resulting in less of a chance for mold and mildew growth, wood rot, and insects and animals entering the crawlspace.

While there have been several efforts to provide covering for crawlspaces, the installation of these coverings has proven challenging. One primary factor contributing to the difficulty is that the environment of the crawlspace makes adhering the covering to the foundation walls challenging.

One method for securing the covering to the foundation walls is disclosed in U.S. Pat. No. 6,575,666. This patent discloses a crawlspace encapsulation system that uses nylon fasteners to secure and support the covering vertically on the foundation walls. The patent states that adhesive tape or a suitable adhesive caulk composition is used to seal the end of the vapor barrier against the top side of the foundation walls, but not to mount or support the liner on the walls. This is because low VOC adhesives suitable for holding to the foundation walls are not suitable for adhering to plastic liners of the type used in crawlspaces. For example, a concrete adhesive, while working well for concrete, does not adhere well to plastic film, particularly the type used for vapor barriers. This difficultly with adhesion is compounded when the plastic film is treated with an antimicrobial substance. Therefore, there is a need for a system for securing and sealing a vapor barrier to a foundation wall that does not require mechanical fasteners or high VOC adhesives. Thus, it would be advantageous to have adhesive and other materials for enclosing a crawlspace having desirable fire retardants and low volatile organic compound (VOC) levels.

Accordingly, it is an object of the present invention to provide a tape mounting system for a foundation wall cover such as a vapor barrier that includes an instant bond adhesive on a first part of the tape for initial mounting to allow for continued installation.

It is a further object of the present invention that the instant bond adhesive on the tape will be a low volatile organic compound (VOC) environmentally friendly adhesive to reduce off-gassing.

It is further object of the present invention to provide a tape mounting system with a second portion adjacent the instant bond adhesive portion that receives a caulk type construction adhesive which is a low volatile organic compound (VOC) environmentally friendly adhesive that cures over time for a permanent installation with an airtight and moisture tight seal between the covering and the foundation wall.

SUMMARY OF THE INVENTION

The above objectives are accomplished according to the present invention by providing a tape mounting system for a foundation covering comprising an adhesion strip including a porous substrate material; the porous substrate material having a wall adhesion side and a covering adhesion side facing opposite the wall adhesion side; an instant bond adhesive portion included on the wall adhesion side and carrying a first instant bond adhesive; an adhesive absorbing portion included on the wall adhesion side that receives and absorbs an adhesive bead applied to a foundation wall; a second instant bond adhesive disposed on the covering adhesion side for engaging a foundation wall covering; and, wherein the instant bond adhesive on the wall adhesion side secures the adhesion strip to the foundation wall until the adhesive bead is cured to carry the foundation wall covering so that an air and moisture tight seal is formed between the foundation wall, the adhesion strip, and the covering material.

In a further advantageous embodiment, the adhesive absorbing portion is disposed vertically above the instant bond adhesive portion when positioned against the foundation wall.

In a further advantageous embodiment, a first release sheet covers the first instant bond adhesive on the wall adhesion side and being releasably carried on the instant bond adhesive portion, wherein the first release sheet is removable to expose the first instant bond adhesive on the wall adhesion side for bonding to the foundation wall.

In a further advantageous embodiment, a second release sheet covers the second instant bond adhesive on the covering adhesion side and being releasably carried on the second side surface, wherein the second release sheet is removable to expose the second instant bond adhesive on the covering adhesion side for bonding to the covering material.

In a further advantageous embodiment, the porous substrate material defining at least the adhesive absorbing portion comprising a porous synthetic fibrous web capable of receiving, absorbing, and distributing the adhesive bead into the adhesion strip.

In a further advantageous embodiment, the porous substrate material defining at least the adhesive absorbing portion comprising a woven material with openings disposed between warp and weft threads capable of receiving, absorbing, and distributing the adhesive bead into the adhesion strip.

In a further advantageous embodiment, the first and second instant bond adhesives comprise low VOC non-toxic adhesive.

In a further advantageous embodiment, the first and second instant bond adhesives comprise a fire retardant low-VOC compliant non-solvent adhesive which off-gases approximately 20 g/l or less.

In a further advantageous embodiment, the first and second instant bond adhesives comprise a hot melt butyl based adhesive compound.

In a further advantageous embodiment, the first instant bond adhesive applied to the instant bond adhesive portion is selected from the pattern consisting of dots, vertical, horizontal, diagonal, or segmented lines, or applied as a solid film generally across the entire surface defining the instant bond adhesive portion on the wall adhesion side.

In a further advantageous embodiment, the second instant bond adhesive is applied directly to the covering adhesion side of the porous material substrate.

In a further advantageous embodiment, a non-porous substrate material is disposed on the covering adhesion side of the porous material substrate.

In a further advantageous embodiment, the second instant bond adhesive is carried directly on the non-porous substrate material opposite the covering adhesion side of the porous material substrate.

The above objectives are further accomplished according to the present invention by providing a tape mounting system for a foundation covering comprising an adhesion strip including a first side surface having an instant bond adhesive portion carrying a first instant bond adhesive, and the adhesion strip including an adhesive absorbing portion that receives and absorbs an adhesive bead applied to a foundation wall; the adhesion strip including a second side surface opposite the first side surface and carrying a second instant bond adhesive covering the second side surface for engaging a foundation wall covering; and, wherein the instant bond adhesive on the first side surface secures the adhesion strip to the foundation wall until the adhesive bead is cured to carry the foundation wall covering so that an air and moisture tight seal is formed between the foundation wall, the adhesion strip, and the covering material.

In a further advantageous embodiment, at least the adhesive absorbing portion of the adhesion strip comprising a porous substrate material capable of receiving, absorbing and distributing the adhesive bead into the adhesion strip.

In a further advantageous embodiment, the porous substrate material defining at least the adhesive absorbing portion comprising a porous synthetic fibrous web capable of receiving, absorbing, and distributing the adhesive bead into the adhesion strip.

In a further advantageous embodiment, the porous substrate material defining at least the adhesive absorbing portion comprising a woven material with openings disposed between warp and weft threads capable of receiving, absorbing, and distributing the adhesive bead into the adhesion strip.

In a further advantageous embodiment, a first release sheet covers the first instant bond adhesive and being releasably carried on the instant bond adhesive portion, wherein the first release sheet is removable to expose the first instant bond adhesive for bonding to the foundation wall.

In a further advantageous embodiment, a second release sheet covers the second instant bond adhesive and being releasably carried on the second side surface, wherein the second release sheet is removable to expose the second instant bond adhesive for bonding to the covering material.

The above objectives are further accomplished according to the present invention by providing a tape mounting system for a foundation covering comprising an adhesion strip including a porous substrate material; the porous substrate material having a wall adhesion side and a covering adhesion side facing opposite the wall adhesion side; an instant bond adhesive portion included on the wall adhesion side and carrying a first instant bond adhesive; an adhesive absorbing portion included on the wall adhesion side that receives and absorbs an adhesive bead applied to a foundation wall; a non-porous substrate material disposed on the covering adhesion side of the porous material substrate; a second instant bond adhesive carried on the non-porous substrate material opposite the covering adhesion side of the porous material substrate for engaging a foundation wall covering; and, wherein the instant bond adhesive on the wall adhesion side secures the adhesion strip to the foundation wall until the adhesive bead is cured to carry the foundation wall covering so that an air and moisture tight seal is formed between the foundation wall, the adhesion strip, and the covering material.

BRIEF DESCRIPTION OF THE DRAWINGS

The system designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
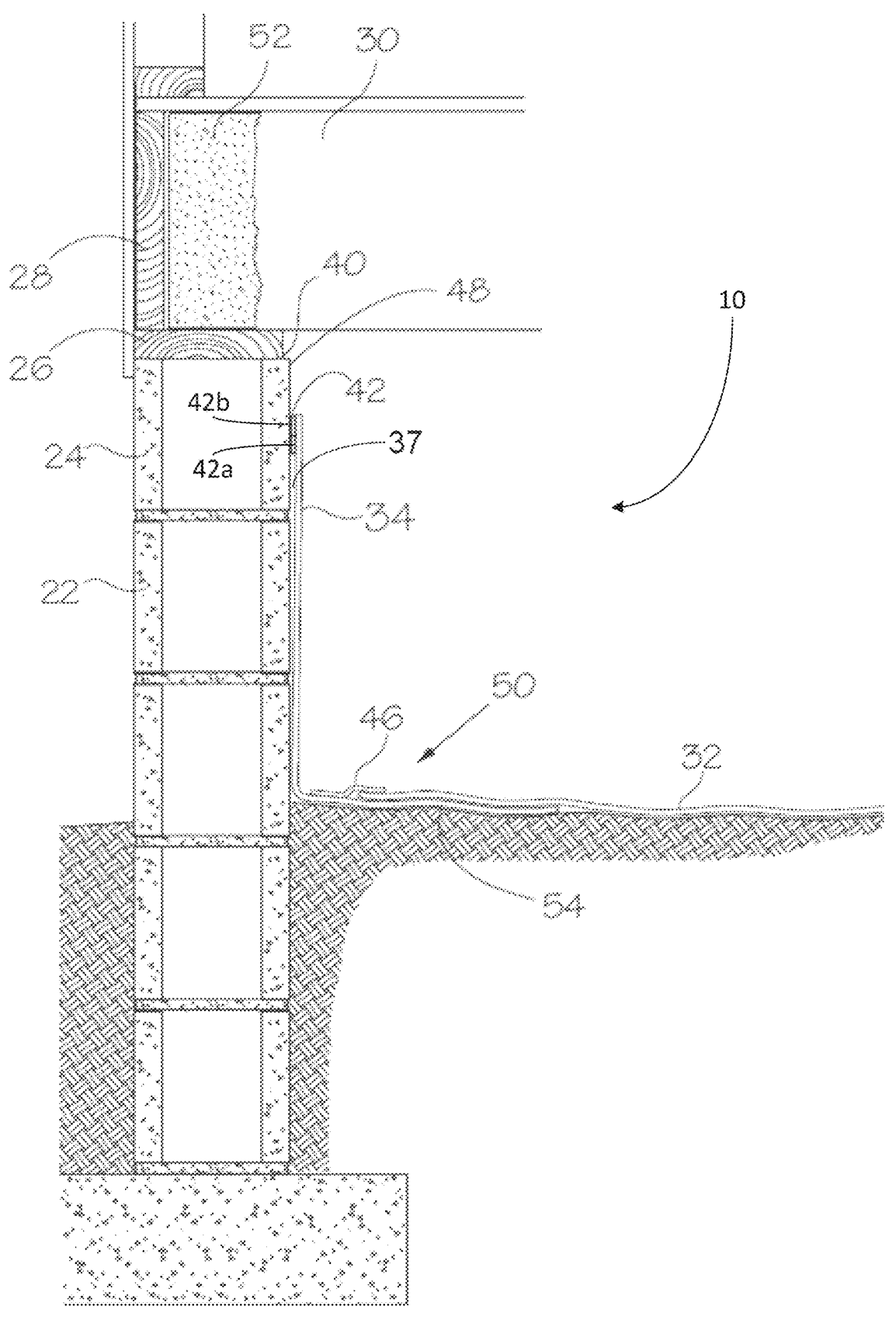
FIG. 1 shows a cross-section view of a tape mounting system for a foundation covering according to the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 2:
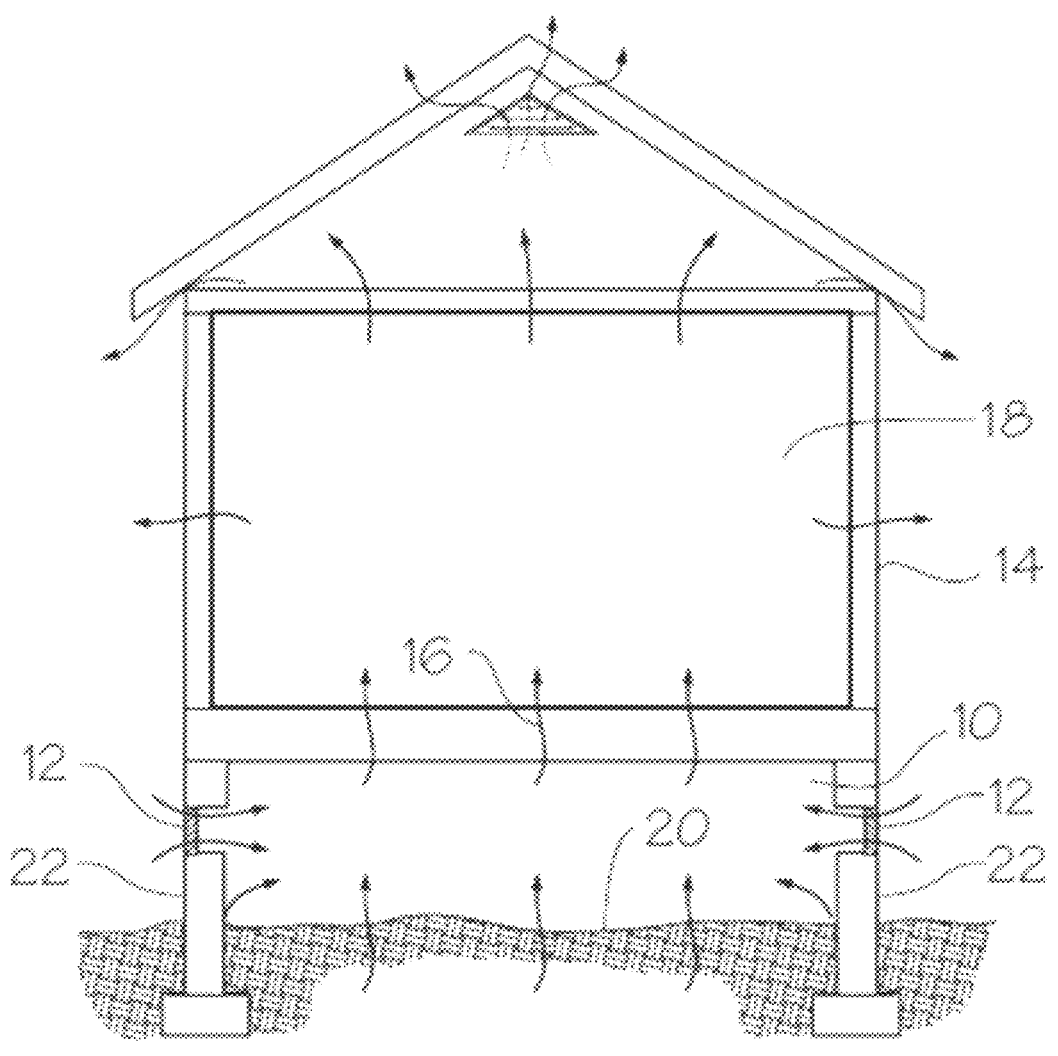
FIG. 2 shows an airflow schematic diagram of a structure involving a crawlspace.

Referring to FIG. 2, a typical residential structure is shown having crawlspace 10 containing vents 12 that allow air to pass into the crawlspace from the exterior of structure 14. Air from within the crawlspace can travel in a direction shown generally as 16 and into the living space 18. Moisture can seep into the crawlspace through foundation walls 22 and from crawlspace ground floor 20. Additionally, the airflow from the vents causes the air in the crawlspace to be approximately the same temperature as that of the ambient air in the outside environment. Further referring to FIG. 1, by installing a covering, such as a plastic sheet vapor barrier 50, along foundation walls 22 and ground floor 20, the introduction of moisture into crawlspace 10 can be reduced and the flow of air upward through the structure better controlled. While the illustrated embodiments show a plastic sheet type vapor barrier, this is by way of example only, as the tape mounting system of the present invention can be used to secure most any type of covering to a foundation wall or other part of a structure. For example, the tape mounting system of the present invention can be used to secure various types of wall board, plastic boards, BAT insulation, foam boards, decorative panels, plastic or fabric sheet material, wood panels and boards, and any other item that needs to be secured and seal against another surface of a structure, such as a foundation wall.

Referring now to FIG. 1, in one embodiment, foundation wall 22 comprises a series of blocks 24. These blocks are typically constructed from concrete, and can include sand, fine gravel, cinder, ash, or other additives based upon the type of block for construction. Blocks can also be made from brick, metal, or other materials. Foundation wall 22 may also typically be formed from poured concrete into a form that shapes the foundation wall. Foundation wall 22 supports sill plate 26 which in turn supports the band joist 28 and floor joist 30. Floor joist 30 supports the lower floor of the structure and also generally defines the ceiling of crawlspace 10. Typically, the blocks are hollow and are not insulated. Preferably, insulation is applied to the foundation, especially the band joist 28, to insulate the crawlspace from the outside environment. In one arrangement, insulation 52 is applied adjacent to band joist 28 around the crawlspace. Further, when vents 12 are sealed, insulation is placed against the sealed vent to further insulate the crawlspace.

In the illustrated embodiment of the present invention in FIG. 1, the covering comprises a vapor barrier 50 and may be a single piece of material that is installed on crawlspace floor 20 and runs up foundation walls 22. However, in a single piece embodiment, it is necessary for the installers to step on the portion of vapor barrier 50 that covers the floor of the crawlspace which can potentially lead to damage of the barrier. Therefore, the present invention includes a preferred embodiment where vapor barrier 50 is in two sections, a floor cover 32 and wall portion 34. When the barrier is in two sections, there is an advantage in installation since wall portion 34 can be installed first allowing the individuals that install the barrier to walk on the dirt floor without having to step on the barrier.

Figure 3A:
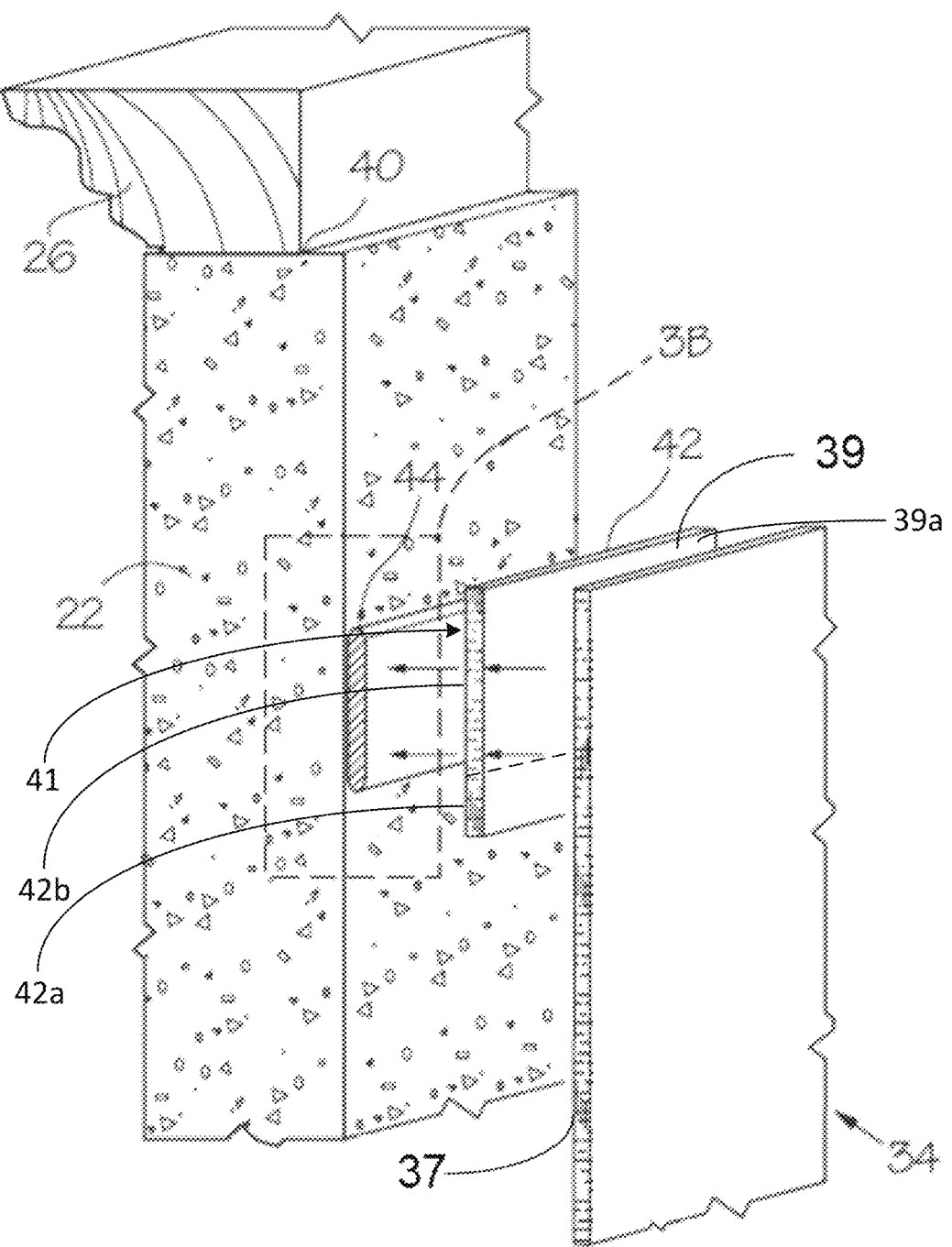
FIG. 3A shows an exploded view of the tape mounting system for a foundation covering according to the present invention.
Figure 3B:
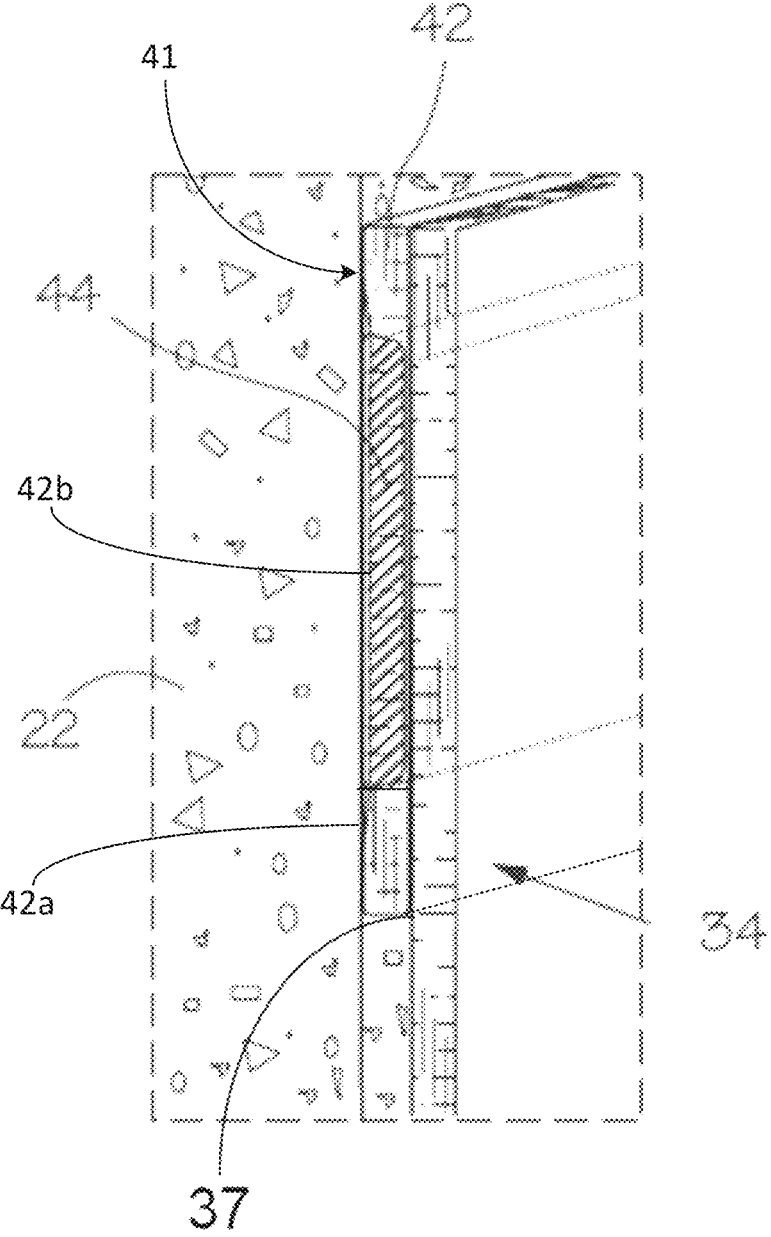
FIG. 3B shows a detailed perspective view of the tape mounting system for a foundation covering according to the present invention.

Referring to FIGS. 1, 3A and 3B, vapor barrier 50 comprises a moisture impervious sheet for both the floor cover and wall portions 32, 34, respectively. In the illustrated arrangement, the moisture impervious sheets that defines vapor barrier 50 include wall portion 34 having a first exterior side surface 37 arranged to extend adjacent to and downward along foundation wall 22, and floor cover 32 extending across the dirt floor 20.

The moisture impervious sheets 32, 34 used for vapor barrier 50 are preferably highly puncture-resistant and includes an antimicrobial property treatment to inhibit mold and bacteria that may cause staining, unpleasant odors, and premature deterioration. Preferably, moisture impervious sheet 32, 34 includes a fire-retardant treatment. The fire retardant and antimicrobial properties may be inherent in the specific materials used to create vapor barrier 50 or may be added by chemical treatment as is known to those skilled in the art. Additionally, vapor barrier 50 is preferably white in color so that it is easier to see whether mold, insects or other items invade the crawlspace after the vapor barrier is installed. In one embodiment, moisture impervious sheet 32, 34 is selected from the group consisting of plastic film sheeting and rubberized sheeting. As in the illustrated embodiment of FIG. 1, moisture impervious sheets 32, 34 consist of a solid single layered vinyl sheet. Moisture impervious sheets 32, 34 can generally range in thickness from about 1 mil to 25 mil for most crawlspace applications, but the present invention is not to be constructed as limited to this range of thickness, which is cited by way of example only.

Figures 4, 5:
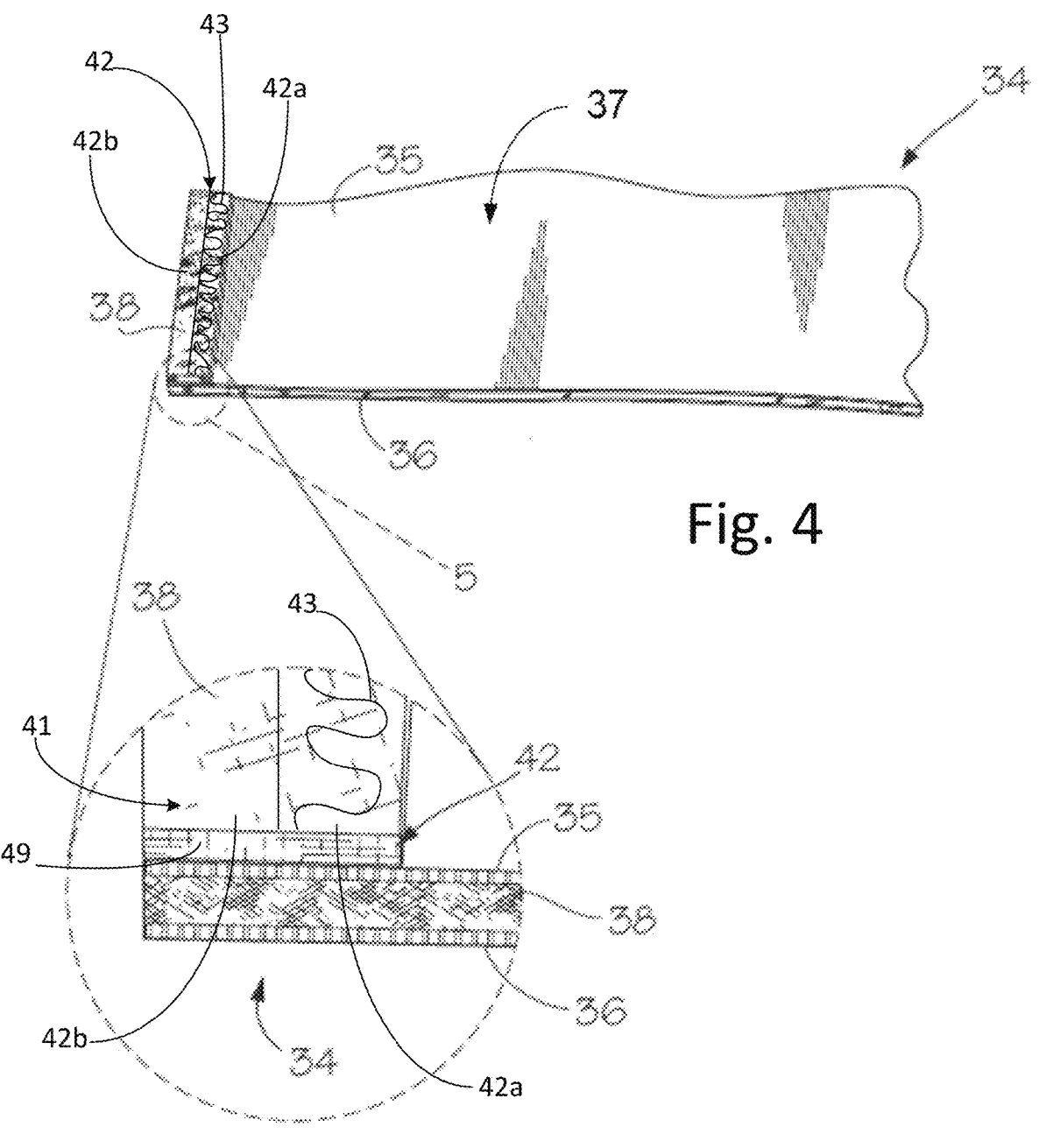
FIG. 4 shows a perspective view of mounting tape on a foundation covering according to the present invention.
FIG. 5 shows a detailed perspective view of an end portion of FIG. 4.

Referring to FIGS. 4 and 5, in an alternative embodiment, wall portion 34 and floor cover 32 include several layers including a core layer 38, a moisture impervious generally solid first outer layer 35 bonded to and completely covering a first side of core layer 38, and a moisture impervious generally solid second outer layer 36 bonded to and completely covering a second side of core layer 38 opposite the first side. In one embodiment, core layer 38 can comprise a woven or non-woven material, for example a non-woven fabric or polymer material, to provide strength and puncture resistance. Further, the first and second outer layers 35 and 36 may be selected from the group consisting of polymer/plastic films and rubberized sheeting to provide for the generally moisture impervious nature required of vapor barrier 50. While other material may also be used, the plastic and rubberized sheeting is currently preferred in the industry for durability, cost and moisture resistance.

Referring to FIGS. 1, 3A and 3B, vapor barrier 50 is mounted to foundation wall 22 using a tape mounting system for securing and sealing vapor barrier 50 to foundation wall 22. In the illustrated embodiment, the tape mounting system comprises an adhesion strip 42 with a porous substrate material that bonds to the exterior side surface 37 of vapor barrier 50 on a covering adhesion side and with the foundation wall 22 on the opposite wall adhesion side, thus eliminating the need for mechanical fasteners to secure the vapor barrier 50 to the foundation walls 22. In a preferred embodiment, the tape is provided in a roll that is unrolled when being applied. In one embodiment, the porous substrate material of adhesion strip 42 includes an instant bond adhesive on a portion of the wall adhesion side for initial mounting and securing to foundation wall 22, and a second part of the porous substrate material on the wall adhesion side is adapted to absorb a low volatile organic compound (VOC) environmentally friendly adhesive bead that cures over time for a permanent installation with an airtight and moisture tight seal between the vapor barrier 50 and foundation wall 22. The covering adhesion side of the porous substrate material also includes a second instant bond adhesive for engaging the foundation wall cover material. This allows an installer to continue working without waiting on cure time for a permanent attachment. Thus, speeding up the installation time and reducing installation costs.

With further reference to FIGS. 6, 7, 9 and 10, in one embodiment, on wall adhesion side 41 of adhesion strip 42 that engages against foundation wall 22, the porous substrate material 49 includes an instant bond adhesive portion 42*a* carrying an instant bond adhesive 43, and an adhesive absorbing portion 42*b* that receives and absorbs a caulk type construction adhesive 44 which cures over time. Preferably, a lower half portion of wall adhesion side 41 carries the instant bond adhesive 43 and defines instant bond adhesive portion 42*a*. The upper half portion of wall adhesion side 41 comprises the adhesive absorbing portion 42*b*. As shown in the illustrated embodiments, instant bond adhesive portion 42*a* is carried on a lower portion of wall adhesion side 41 of the porous substrate material 49 of adhesion strip 42. Accordingly, when mounted, the adhesive absorbing portion 42*b* is disposed vertically above instant bond adhesive portion 42*a* when positioned against the foundation wall.

In one embodiment, at least the adhesive absorbing portion 42*b* of adhesion strip 42 comprises porous substrate material 49. The porous substrate material 49 may comprise a porous synthetic fibrous web capable of absorbing a caulk type construction adhesive 44 (FIGS. 3A, 3B and 7) into adhesion strip 42 to first exterior side surface 37 of moisture impervious sheet wall portion 34 during mounting to foundation wall 22 so that an air and moisture tight seal is formed between the foundation wall, adhesion strip, and moisture impervious sheet. At least the adhesive absorbing portion 42*b* of adhesion strip 42 may be selected from the group consisting of woven and nonwoven synthetic fabric materials. Natural fibers are not ideal for crawlspace application as they will degrade and decay, thus eventually allowing air and moisture to pass through. In one preferred embodiment, the adhesive absorbing portion 42*b* of adhesion strip 42 comprises non-woven hydroentangled spun-lace PET polyester fibers entangled in both a vertical and horizontal direction to promote strength and durability. In a further advantageous embodiment, the adhesive absorbing portion 42*b* of adhesion strip 42 is selected with a weight in the range of 5-300 grams per square meter (gsm) providing a high void volume to facilitate absorption of adhesive 44 through to first exterior side surface 37 of moisture impervious sheet wall portion 34. In one embodiment, the porous substrate material 49 defining at least adhesive absorbing portion 42*b* comprising a woven material with openings disposed between warp and weft threads capable of receiving, absorbing, and distributing the adhesive bead into the adhesion strip 42.

Because the adhesives used in these type of applications are relatively thick and of paste like consistency, if the porous material substrate 49 defining the adhesive absorbing portion 42*b* of adhesion strip 42 is not sufficiently porous then the adhesive will not travel sufficiently into the porous material for a strong bond and can allow for air and moisture to pass through the adhesion strip 42 in an unwanted manner. In a preferred embodiment, the porous material substrate 49 absorbs an adhesive bead completely through to the moisture impervious sheet on the covering adhesion side of the adhesion strip 42. Accordingly, providing the adhesive absorbing portion 42*b* of adhesion strip 42 in the range of approximately 5-300 gsm ensures sufficient porosity to allow the construction grade adhesives to be absorbed and distributed through adhesion strip 42 to first exterior side surface 37 of moisture impervious sheet wall portion 34. Preferably, adhesion strip 42 is also treated with fire retardant and an antimicrobial treatment.

Figure 7:
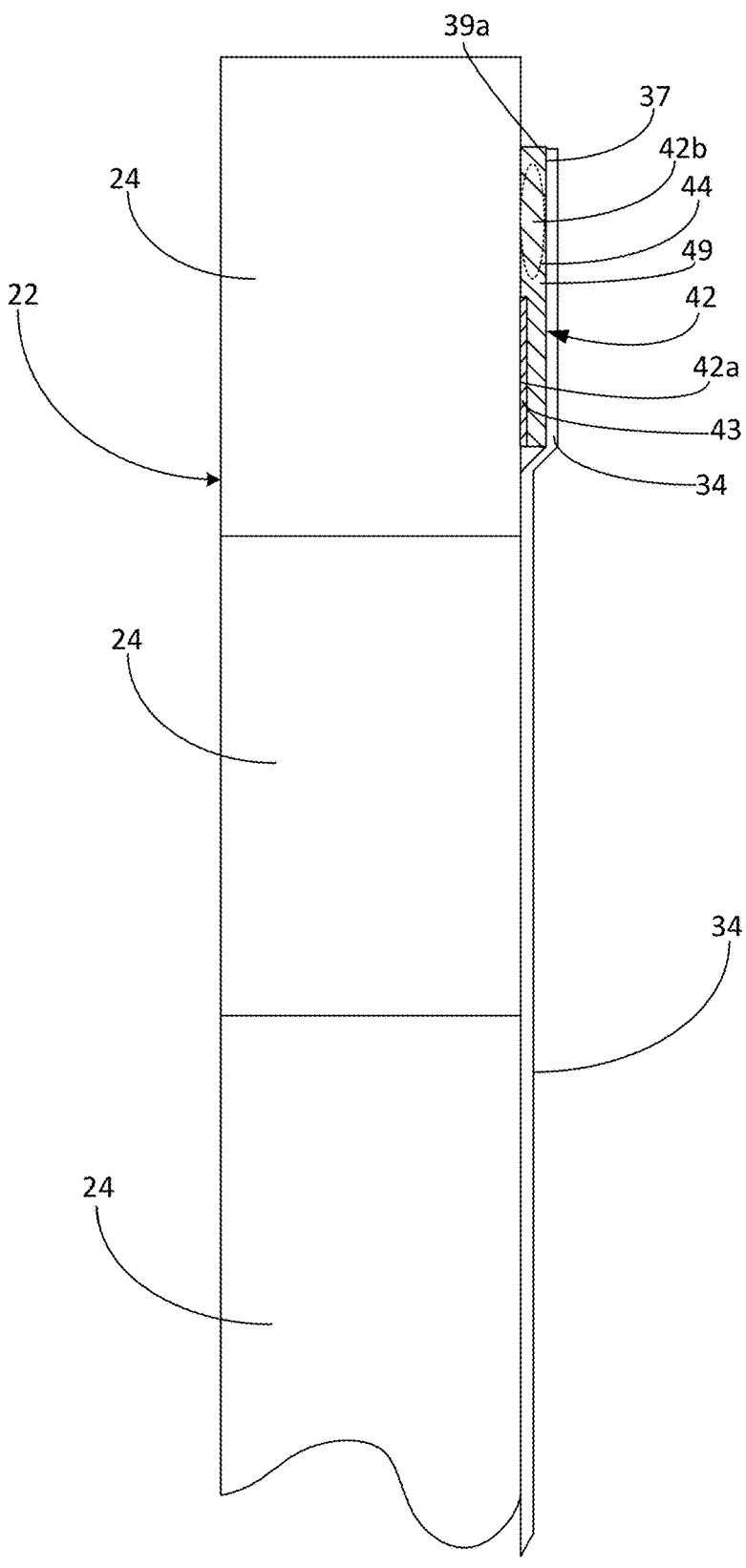
FIG. 7 shows a cross-section view of a foundation wall having a covering mounted thereon using the tape mounting system according to the present invention.

Referring to FIGS. 4, 5 and 7, in one arrangement, adhesion strip 42 may be comprised entirely of a porous synthetic fibrous web with a hot melt instant bond adhesive applied to a portion of adhesion strip 42 to define instant bond adhesive portion 42*a*.

Adhesion strip 42 will typically range in thickness from approximately 1-20 mil to support moisture impervious sheet wall portion 34 and so that adhesive 44 is absorbed into, and preferably, absorbed completely through to first exterior side surface 37 of the vapor barrier 50. The heavier the moisture impervious sheet, the thicker adhesion strip 42 must be to support it on foundation wall 22.

Covering adhesion side 39 of adhesion strip 42 can be bonded to first exterior side surface 37 of the moisture impervious sheet 34 using a water-based, solvent based, PUR, silicone, epoxy, acrylic, or any conventional or cross linkable hot melt adhesive, or thermoplastic. These adhesives can be applied using, spray, roll coat, slot die (extrusion), gravure, or similar methods. In one arrangement, adhesion strip 42 is secured to first exterior side surface 37 of moisture impervious sheet wall portion 34 using an instant bond adhesive film 39*a* pre-applied to covering adhesion side 39 of adhesion strip 42. Alternatively, covering adhesion side 39 of adhesion strip 42 can be secured to first exterior side surface 37 of vapor barrier 50 using a double-sided adhesive tape. In this arrangement, it is preferably that the double-sided tape include a dry mount adhesive carried on a first side bonding to covering adhesion side of 39 adhesion strip 42, and a second side carry an adhesive selected from the group consisting of an instant bond pressure sensitive adhesive, heat activated adhesive, or solvent activated adhesive. Utilizing a dry mount adhesive prevents over absorption of the adhesive into the porous adhesion strip 42 while still securely bonding.

Figure 9:
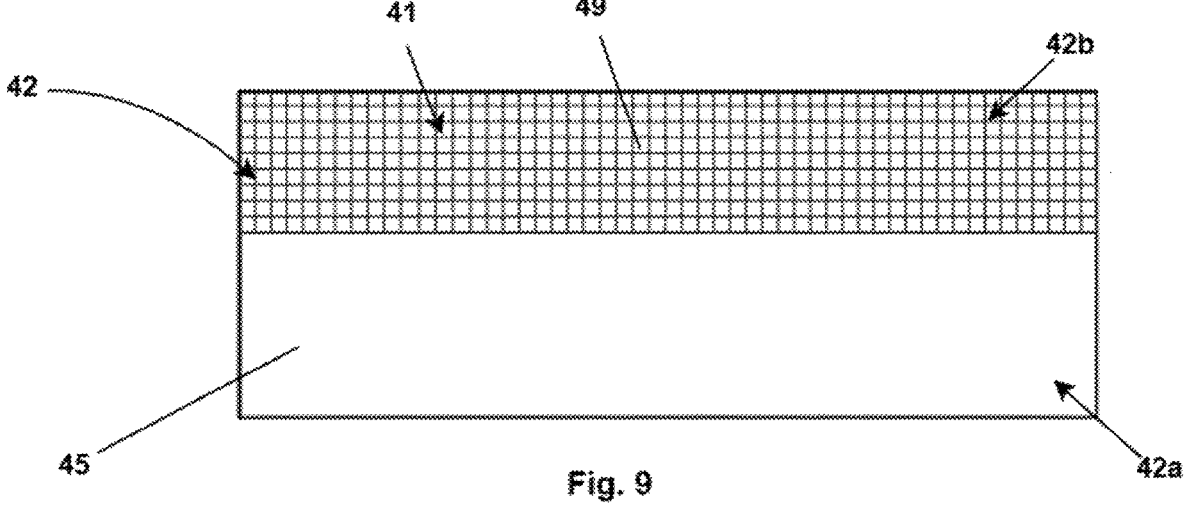
FIG. 9 shows a front view of a first side surface of the tape according to the present invention; and, FIG. 10 shows a front view of a first side surface of the tape with a first release sheet partially removed according to the present invention.
Figure 10:
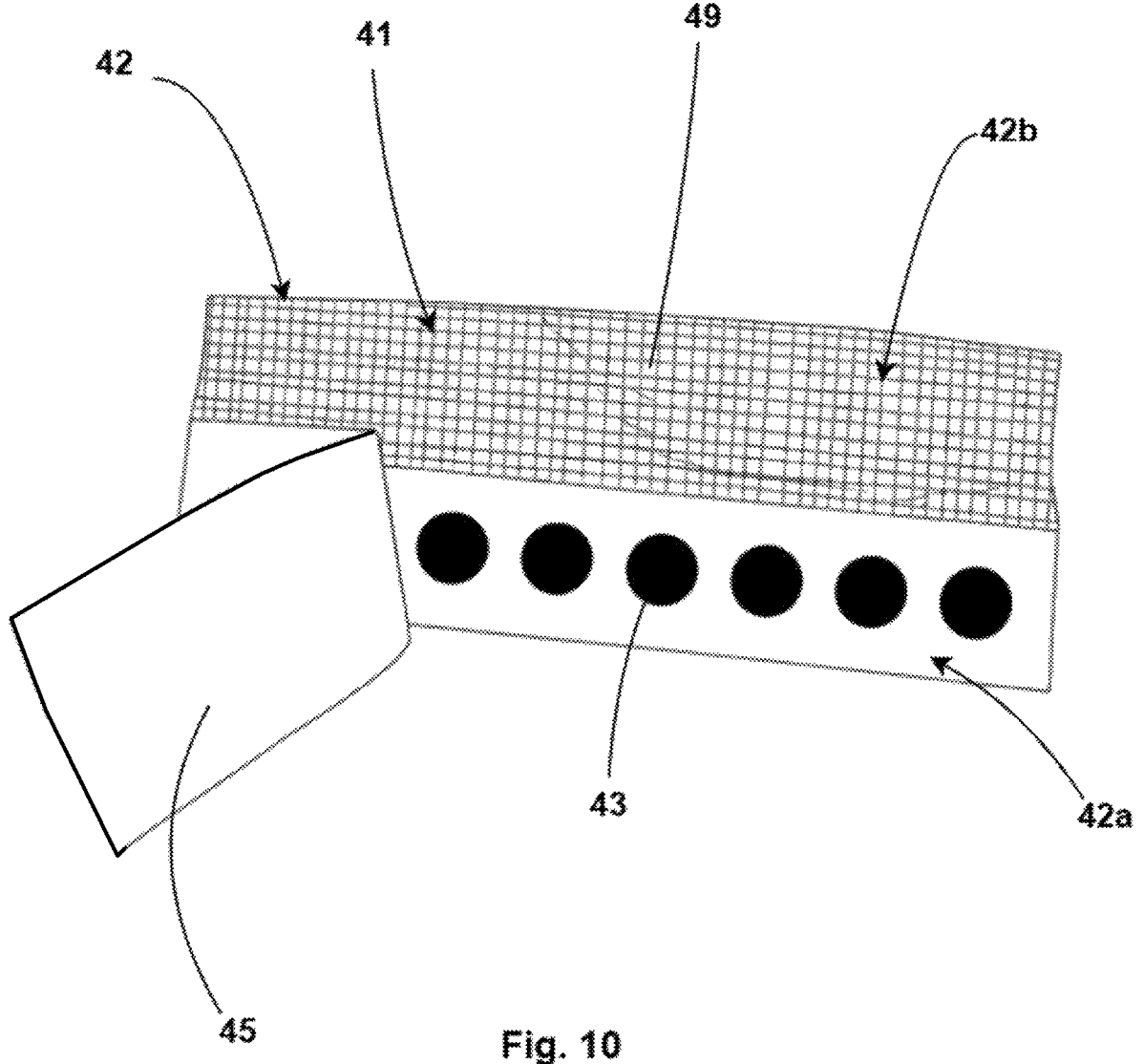

Referring to FIGS. 9 and 10, in the illustrated embodiment, a first release sheet 45 is provided covering the first instant bond adhesive 43 on the wall adhesion side 41 and is releasably carried on the instant bond adhesive portion 42*a*. Accordingly, the first release sheet 45 is removed to expose the first instant bond adhesive 43 on the wall adhesion side 41.

Figure 8:
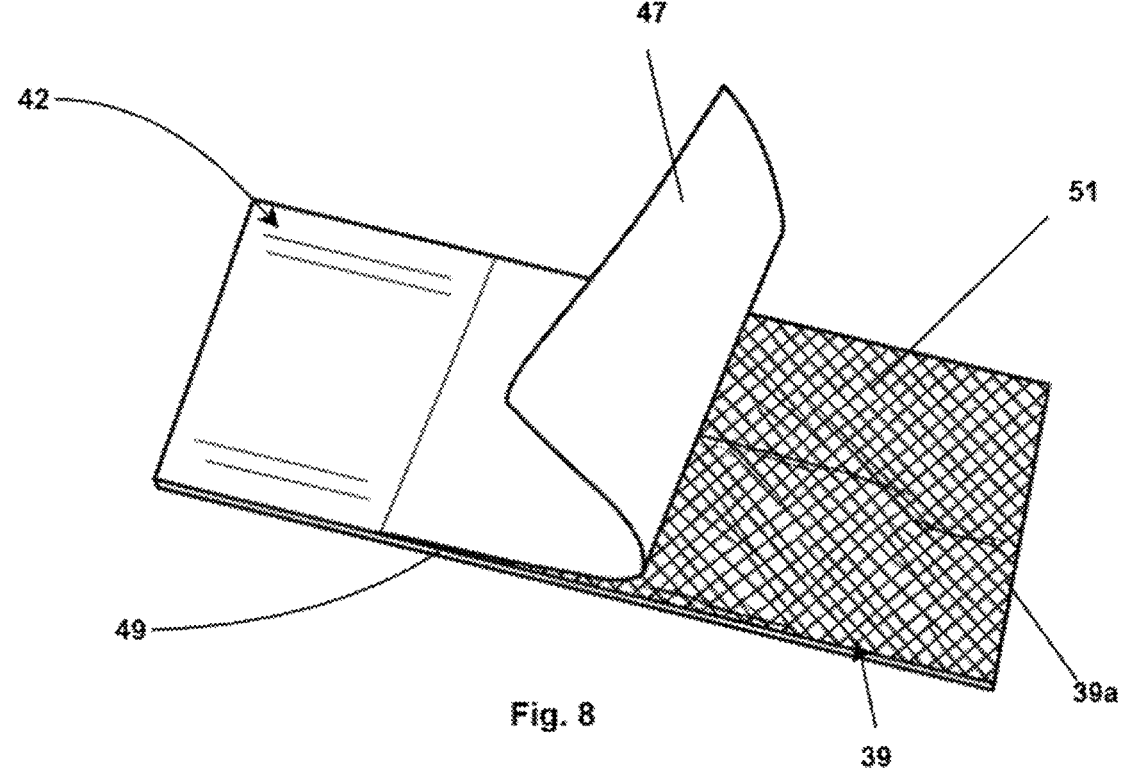
FIG. 8 shows a perspective view of a second side surface of the tape according to the present invention.

Referring to FIG. 8, in the illustrated embodiment, a second release sheet 47 is provided covering the second instant bond adhesive 39*a* on the covering adhesion side 39 and is releasably carried on the covering adhesion side 39. Accordingly, the second release sheet 47 is removed to expose the second instant bond adhesive 39*a* on the covering adhesion side 39 for bonding to a covering material, for example, vapor barrier 50. In one embodiment, the second instant bond adhesive 39*a* is applied directly to the covering adhesion side 39 of porous material substrate 49, as best shown in FIG. 7. In a further embodiment, as shown in FIG. 8, a non-porous substrate material 51 is disposed on the covering adhesion side 39 of the porous material substrate 49. In this arrangement of FIG. 8, the second instant bond adhesive 39*a* is carried directly on the non-porous substrate material 51 opposite said covering adhesion side of the porous material substrate 49 for bonding to the foundation wall covering.

To install the vapor barrier 50, a moisture impervious sheet as detailed above is selected. The second release sheet 47 is removed from adhesion strip 42 which is then non-releasably bonded to first exterior side surface 37 of moisture impervious sheet wall portion 34, wherein adhesion strip 42 comprises a porous material, for example, a synthetic fibrous web or non-woven fabric material adapted to absorb and distribute adhesive 44 through adhesive absorbing portion 42*b* to first exterior side surface 37 of the vapor barrier 50, and wherein adhesion strip 42 is capable of supporting the full weight of moisture impervious sheet wall portion 34 in a vertical hanging arrangement. A bead of adhesive 44 is applied to foundation wall 22 and first release sheet 45 is then removed from adhesion strip 42. The moisture impervious sheet wall portion 34 is aligned so that first exterior side surface 37 extends adjacent to and downward along foundation wall 22. Adhesion strip 42 is then pressed into the bead of adhesive 44 so that adhesive 44 is absorbed into the porous substrate material of adhesive absorbing portion 42b, while also pressing instant bond adhesive portion 42a against foundation wall 22 forming an air and moisture tight seal between foundation wall 22, adhesion strip 42, and moisture impervious sheet wall portion 34. Instant bond adhesive portion 42a secures vapor barrier 50 to foundation wall 22 at least until the bead of adhesive 44 has fully cured.

Thus, by providing instant bond adhesive together with a porous material adhesive absorbing portion, adhesion strip 42 secures and seals to an exterior side surface of a moisture impervious sheet and secures the covering to a foundation wall 22 using a nonvolatile low-VOC compliant nonsolvent adhesive can be used in the crawlspace to secure wall portion 34 to foundation walls 22 without any mechanical fasteners or concerns with adhesives that are not low VOC compliant, while also allowing for continued installation while the nonvolatile low-VOC compliant nonsolvent adhesive cures. In a further embodiment, adhesion strip 42 can also be used in securing insulation sheets and other materials to a foundation wall, which typically included a rigid foam core covered by paper or metallic foil sheet top and bottom layers. Accordingly, adhesion strip 42 would be secured to the paper or metallic bottom layer using an adhesive in the same manner as described above for wall portion 34. In this arrangement adhesion strip 42 is preferably selected from the woven or non-woven flexible material as detailed above.

Additionally, the tape mounting system of the present invention can also be used as a patch kit to repair failed coverings that may have separated from the foundation walls. In this arrangement, the tape is secured to the foundation wall above the failed covering as detailed herein. A new section of covering is then secured to covering side surface 39 that hangs down or extends over the failed section of the previously installed covering. The new section of covering is then taped at its distal end to the surface of the old covering to seal the new section to the old section.

The adhesion strip 42 of the vapor barrier 50 is generally located along a top edge of wall portion 34 on the side adjacent foundation wall 22. Preferably, adhesion strip 42 is approximately a one to two inch long strip of material extending downward from the top edge to provide sufficient surface area for receiving the fire retardant low-VOC compliant non-solvent adhesive 44. Adhesion strip 42 extends longitudinally along the entire length wall portion 34 parallel to the top edge to provide continuous area for adhesive 44 to secure and mount wall portion 34 to the foundation walls in an air and moisture tight arrangement.

In the illustrated embodiment, wall portion 34 includes a tail section 54 extending horizontally outward from a base of foundation wall 22 along the ground. Floor cover 32 is then installed in an overlapping arrangement with at least a portion of tail section 54 along a bottom edge of wall portion 34. In one embodiment, the floor section overlaps the wall section by at least six inches. A sealing tape 46 is then disposed over a seam defined by the overlapping of floor cover 32 on wall portion 34 so that the wall portion and floor cover are secured together on tail section 54 to resist moisture and vapor transfer through the seam. In one embodiment, the sealing tape is four inches wide. Preferably, floor cover 32 is the same material as wall portion 34.

A fire retardant low-VOC compliant non-solvent adhesive 44 is used to secure adhesion strip 42 directly to foundation walls 22. Further, due to the improved adhesive surface provided by adhesion strip 42, it becomes possible to use a low-VOC grade adhesive. By using a fire retardant low-VOC compliant non-solvent adhesive, there are significant safety and health benefits from the non-volatile nature of such adhesive in the crawlspace environment where there is limited ventilation. Additionally, the adhesive should be non-toxic since the adhesive will be applied in the crawlspace environment where air is directed upward into the living space above. Accordingly, a sufficient bond is formed to support the wall portion 34 on foundation walls 22 without the need for mechanical fasteners, while also providing an air and moisture tight seal. The adhesive is preferably a polyurethane base.

Figure 6:
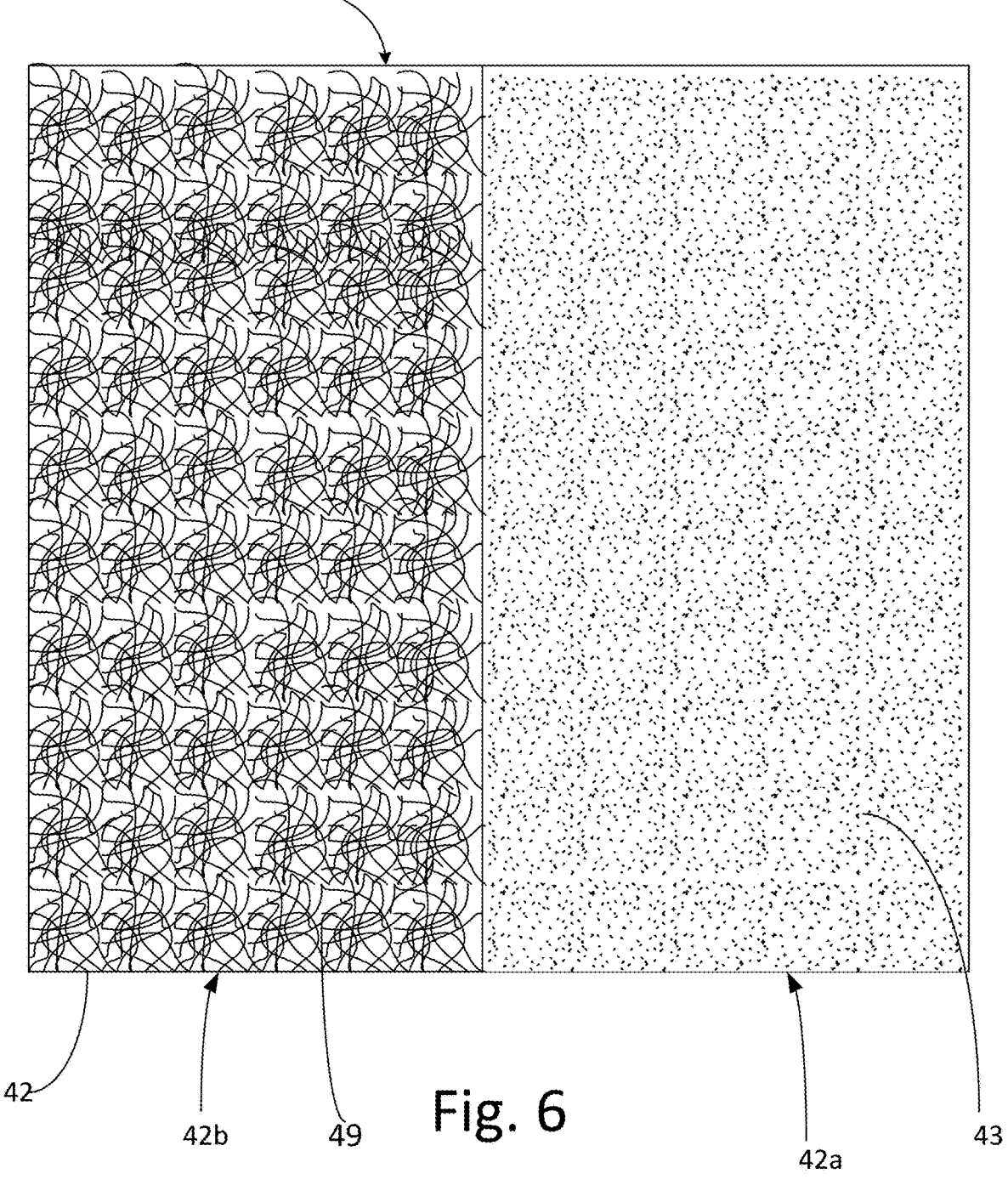
FIG. 6 shows a front view of a section of the mounting tape according to the present invention.

The first instant bond adhesive included in instant bond adhesive portion 42a on the wall adhesion side and the second instant bond adhesive applied to the covering adhesion side are also preferably a low VOC non-toxic adhesive. In one embodiment, a hot melt butyl based adhesive compound can be used for the first and second instant bond adhesives of adhesion strip 42. Referring to FIGS. 6 and 10, in the illustrated embodiments, instant bond adhesive 43 can be applied to adhesion strip 42 in dots, vertical, horizontal, diagonal, or segmented lines, or applied as a solid film generally across the entire surface defining instant bond adhesive portion 42a. Vertical strips, dots or a solid film of adhesive are preferred to maximize shear strength against the foundation wall.

VOC levels are expressed in pounds per gallon (lbs/gal) or grams per liter (g/l). Generally, a product is given a low-VOC compliant mark if it has a VOC content that off-gases less than 50 g/l. 20. Preferably, the fire retardant low-VOC compliant non-solvent instant bond adhesives and adhesive bead 44 of the present invention off-gases approximately 20 g/l or less.

In one embodiment, there is a gap 48 (FIG. 1) between the top of the foundation wall and the top edge of wall portion 34. This gap allows for subsequent inspection of the foundation wall such as those for termites. In one embodiment, the gap is three inches.

Further, wall portion 34 and floor cover 32 can have an R value in that it provides insulation to the foundation walls and crawlspace. This is particularly true when the barrier is constructed with 20 mil material with a core between two external plastic layers (FIGS. 4 and 5). Further, a vapor barrier 50 with a sufficient fire rating and low-VOC is desirable. The barrier can be fire retardant such that the barrier has a fire rating (FR) rating.

Prior to installing the vapor barrier, an antimicrobial spray can be applied so areas that are prone to moisture can be treated in anticipation of water leaks. For example, under bathrooms and laundry rooms, there is a possibility of water leaking into the crawlspace. The interior walls of the crawlspace that are adjacent to the exterior of the structure can have insulation applied to increase the insulation of the structure. This minimizes the amount of heat transfer from the crawlspace and the exterior of the structure. A sealant can be placed between the top of the foundation wall and the sill plate at 40 to further provide a barrier for moisture, insects, and other items from entering the crawlspace in gaps or spaces between the foundation wall and sill joist. The vapor barrier properties of fire retardant and antimicrobial may be inherent to the specific materials selected, or may be a chemical treatment applied to the vapor barrier.

In alternative embodiments, the invention can include the addition of a dehumidifier which can be installed so that proper humidity levels are maintained. Circulation fans can be placed to assist the dehumidifiers so that even air conditions result. Humidistat controls can be used to conserve energy and have the circulation fans operate according to detected humidity levels rather than simply having fans manually actuated or running all the time. Lighting can be added during the crawlspace enclosing process so that subsequent inspections and future crawlspace access is made easier. In the event that the air is conditioned with the dehumidifiers or fans, vents can be sealed to remove the opening to the exterior of the structure further reducing the moisture that can enter the crawlspace. Humidity can be monitored within the crawlspace by installing a remote monitor panel that displays readouts of sensors within the crawlspace for detecting temperature and humidity.

This invention can be professionally installed or provided in a do-it-yourself kit. In one embodiment, the do-it-yourself kit includes the crawlspace vapor barrier, antimicrobial spray, adhesive and humidity and temperature monitor. The kit can include instructions and specifications for purchasing dehumidifier, circulation fans, humidistat controls for circulation fans, lighting, electrical wiring, boxes and breakers, insulating the foundation wall, minimum inch termite inspection gap, insulating the band joist space, sealing the sill plate, sealing off existing crawlspace vents, access doors and panels, condensate drain piping or pumps and installation instructions.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A tape mounting system for a foundation covering comprising:

an adhesion strip including a porous substrate material;

said porous substrate material having a wall adhesion side and a covering adhesion side facing opposite said wall adhesion side;

an instant bond adhesive portion included on said wall adhesion side and carrying a first instant bond adhesive;

an adhesive absorbing portion included on said wall adhesion side that receives and absorbs an adhesive bead applied to a foundation wall; wherein said instant bond adhesive portion is positioned adjacent to and extending parallel with said adhesive absorbing portion;

a second instant bond adhesive disposed on said covering adhesion side for engaging a foundation wall covering; and, wherein said instant bond adhesive on said wall adhesion side secures said adhesion strip to said foundation wall until said adhesive bead is cured to carry said foundation wall covering so that an air and moisture tight seal is formed between the foundation wall, said adhesion strip, and said covering material.

2. The tape mounting system of claim 1 wherein said adhesive absorbing portion is disposed vertically above said instant bond adhesive portion when positioned against said foundation wall.

3. The tape mounting system of claim 1 including a first release sheet covering said first instant bond adhesive on said wall adhesion side and being releasably carried on said instant bond adhesive portion, wherein said first release sheet is removable to expose said first instant bond adhesive on said wall adhesion side for bonding to said foundation wall.

4. The tape mounting system of claim 1 including a second release sheet covering said second instant bond adhesive on said covering adhesion side and being releasably carried on said second side surface, wherein said second release sheet is removable to expose said second instant bond adhesive on said covering adhesion side for bonding to said covering material.

5. The tape mounting system of claim 1 wherein said porous substrate material defining at least said adhesive absorbing portion comprising a porous synthetic fibrous web capable of receiving, absorbing, and distributing said adhesive bead into said adhesion strip.

6. The tape mounting system of claim 1 wherein said porous substrate material defining at least said adhesive absorbing portion comprising a woven material with openings disposed between warp and weft threads capable of receiving, absorbing, and distributing said adhesive bead into said adhesion strip.

7. The tape mounting system of claim 1 wherein said first and second instant bond adhesives comprise low VOC non-toxic adhesive.

8. The tape mounting system of claim 7 wherein said first and second instant bond adhesives comprise a fire retardant low-VOC compliant non-solvent adhesive which off-gases approximately 20 g/l or less.

9. The tape mounting system of claim 1 wherein said first and second instant bond adhesives comprise a hot melt butyl based adhesive compound.

10. The tape mounting system of claim 1 wherein said first instant bond adhesive applied to said instant bond adhesive portion is selected from the pattern consisting of dots, vertical, horizontal, diagonal, or segmented lines, or applied as a solid film generally across the entire surface defining said instant bond adhesive portion on said wall adhesion side.

11. The tape mounting system of claim 1 wherein said second instant bond adhesive is applied directly to said covering adhesion side of said porous material substrate.

12. The tape mounting system of claim 1 including a non-porous substrate material disposed on said covering adhesion side of said porous material substrate.

13. The tape mounting system of claim 12 wherein said second instant bond adhesive is carried directly on said non-porous substrate material opposite said covering adhesion side of said porous material substrate.

14. A tape mounting system for a foundation covering comprising:

an adhesion strip including a first side surface having an instant bond adhesive portion carrying a first instant bond adhesive, said instant bond adhesive portion positioned adjacent to and extending parallel with an adhesive absorbing portion that receives and absorbs an adhesive bead applied to a foundation wall;

said adhesion strip including a second side surface opposite said first side surface and carrying a second instant bond adhesive covering said second side surface for engaging a foundation wall covering; and, wherein said instant bond adhesive on said first side surface secures said adhesion strip to said foundation wall until said adhesive bead is cured to carry said foundation wall covering so that an air and moisture tight seal is formed between the foundation wall, said adhesion strip, and said covering material.

15. The tape mounting system of claim 14 wherein at least said adhesive absorbing portion of said adhesion strip comprising a porous substrate material capable of receiving, absorbing and distributing said adhesive bead into said adhesion strip.

16. The tape mounting system of claim 15 wherein said porous substrate material defining at least said adhesive absorbing portion comprising a porous synthetic fibrous web capable of receiving, absorbing, and distributing said adhesive bead into said adhesion strip.

17. The tape mounting system of claim 15 wherein said porous substrate material defining at least said adhesive absorbing portion comprising a woven material with openings disposed between warp and weft threads capable of receiving, absorbing, and distributing said adhesive bead into said adhesion strip.

18. The tape mounting system of claim 14 including a first release sheet covering said first instant bond adhesive and being releasably carried on said instant bond adhesive portion, wherein said first release sheet is removable to expose said first instant bond adhesive for bonding to said foundation wall.

19. The tape mounting system of claim 14 including a second release sheet covering said second instant bond adhesive and being releasably carried on said second side surface, wherein said second release sheet is removable to expose said second instant bond adhesive for bonding to said covering material.

20. A tape mounting system for a foundation covering comprising:

an adhesion strip including a porous substrate material;

said porous substrate material having a wall adhesion side and a covering adhesion side facing opposite said wall adhesion side;

an instant bond adhesive portion included on said wall adhesion side and carrying a first instant bond adhesive;

an adhesive absorbing portion included on said wall adhesion side that receives and absorbs an adhesive bead applied to a foundation wall;

a non-porous substrate material disposed on said covering adhesion side of said porous material substrate;

a second instant bond adhesive carried on said non-porous substrate material opposite said covering adhesion side of said porous material substrate for engaging a foundation wall covering; and, wherein said instant bond adhesive on said wall adhesion side secures said adhesion strip to said foundation wall until said adhesive bead is cured to carry said foundation wall covering so that an air and moisture tight seal is formed between the foundation wall, said adhesion strip, and said covering material.

* * * * *